July 19, 1949.   E. M. BRUNNER ET AL   2,476,810
METHOD AND APPARATUS FOR RADIOLOGICAL MEASUREMENTS
Filed April 10, 1945
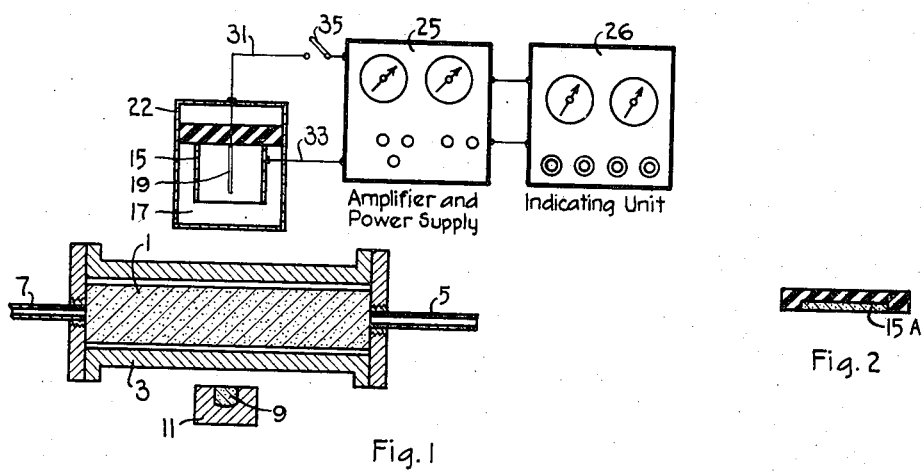
Fig. 1
Fig. 2
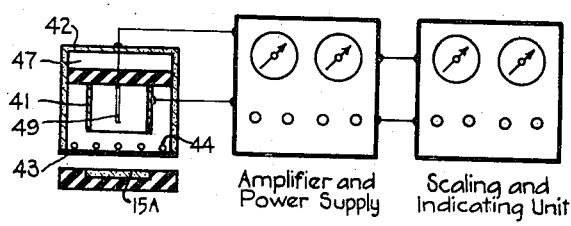
Fig. 3
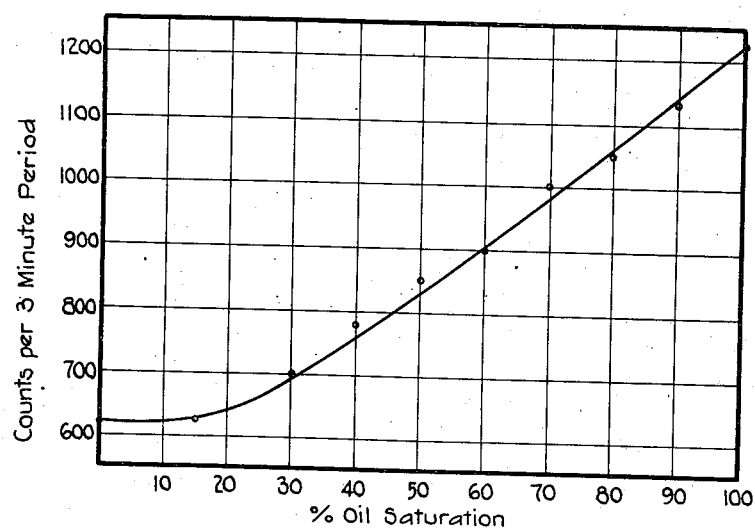
Fig. 4
Inventors: E. M. Brunner
E. S. Mardock
By their Attorney:

Patented July 19, 1949

2,476,810

UNITED STATES PATENT OFFICE 2,476,810

METHOD AND APPARATUS FOR RADIOLOGICAL MEASUREMENTS

Eugene M. Brunner, El Cerrito, and Edwin S. Mardock, Berkeley, Calif., assignors to Shell Development Company, San Francisco, Calif., a corporation of Delaware Application April 10, 1945, Serial No. 587,598

6 Claims. (Cl. 250—83.6)

This invention pertains to a method and apparatus for the investigation and determination of the nature, composition and other characteristics of various bodies or substances by radiological means involving the use of neutrons.

Radiological methods have been applied to various purposes, such as geophysical exploration, for example, in logging oil and gas wells, or in investigating the condition of various industrial elements or structures, for instance, in measuring the wall thickness of metallic sheets, pipes, etc.

In applying these methods, use may be made of different types of radiation, such as X-rays, gamma rays, neutrons, etc., the use of neutrons being of especial advantage because of their extremely high penetrating power.

Neutrons may be produced or generated by the action of a radioactive substance such as radium, radon, polonium, etc., on a substance such as beryllium, lithium, etc. For example, beryllium emits neutrons when impinged upon by alpha particles emanating from radium. A radium-beryllium mixture is therefore a convenient source of neutrons. The neutrons emitted by any such source have an extremely high velocity, corresponding to energy values averaging between $1 \times 10^6$ and $10 \times 10^6$ electron volts, and are called fast neutrons. Fast neutrons have the property of passing freely through heavy elements, that is, elements of heavy atomic weight, which are not pervious to any considerable depth to radiations of other types, such as alpha, beta and even gamma rays. On the other hand, light elements, that is, elements of low atomic weight, and especially hydrogen, have the property of greatly decreasing the velocity of the neutrons. Neutrons whose velocity has been reduced by collision with low atomic weight elements are known as slow neutrons. The passage of neutrons through substances comprising high atomic weight elements thus results principally in scattering or diffusing these neutrons, while a passage of neutrons through substances comprising low atomic weight elements results in both slowing down and scattering said neutrons.

Since neutrons carry no electric charge, they cannot be directly detected by ordinary means used for the detection of other radioactive radiations, such more specifically as Geiger-Mueller counters and ionization chambers. However, certain elements or compounds thereof, such as cadmium, lithium, boron, boron trifluoride, etc., which are substantially insensitive to the effect of fast neutrons, have the property of disintegrating with an accompanying emission of alpha or gamma particles when impinged upon by slow neutrons. By placing such elements in the vicinity of Geiger counter or ionization chamber detectors, for example, by coating the walls of the latter with cadmium, or by filling them with boron trifluoride, these detectors may be applied for the detection of slow neutrons. Since, for a neutron radiation source of a given intensity, the number of slow neutrons reaching such detector will be substantially a function of the amount of the hydrogen atoms present in the medium traversed by the path of neutrons to the detector, this amount can be accurately measured by observing or recording the indications of a properly calibrated detector of this type. This method can therefore be advantageously used for determining the presence of substances containing free or combined hydrogen, such as water, hydrocarbon liquids or gases, etc., in cases where more direct measurements are for some reason difficult or impossible.

It has however now been found that measurements or determinations made in the manner described above are not always reliable or accurate, due to the fact that sources of neutrons, such as a radium-beryllium mixture, actually emit not only neutrons, but also radiations of other types. Thus, while the beryllium of such a mixture emits, under the influence of radium, a neutron radiation, the radium itself simultaneously emits alpha, beta and gamma radiations. The response of a neutron detector, comprising for example a Geiger-Mueller counter, is therefore partially due in such cases to the effect of slow neutrons on the disintegrating element, such as cadmium, placed about the counter, and partially to the direct effect of gamma rays from the same source on the counter itself. Since, even with the use of lead filters or other suitable devices, it is sometimes impossible to separate neutron and gamma radiations from each other and to differentiate between the detector response due to neutrons and that due to gamma-ray leakage, the indications of said detectors lack in such case the accuracy desired with regard to quantitative hydrogen atom measurements.

It is therefore an object of this invention to provide a method and an apparatus free of the above drawbacks, whereby the hydrogen content, that is, the amount of free or bound hydrogen atoms present in a particular substance or body of matter, can be determined, thus yielding the desired qualitative and quantitative measurements with regard to said substance or body.

This and other objects of the present invention will appear from the following description, taken with reference to the attached drawings, wherein Figures 1 and 3 are diagrams schematically showing arrangements of apparatus used in practicing the present invention;

Figure 2 is a diagrammatic view in cross-section of a test plate used in practicing the present invention;

Figure 4 is an illustrative calibration curve such as may be used in practicing the present invention.

The operation of the present invention is based on the following principles. As stated, slow neutrons upon striking certain elements knock off or cause the emission of gamma rays, as in the case of cadmium, or alpha particles as in the case of boron or lithium. This may be termed the immediate effect of slow neutron bombardment. Some other elements, however, such as silver, indium, rhodium, manganese, dysposium, etc., do not lose any radioactive particle immediately upon being subjected to neutron impact. Instead, these elements upon receiving a neutron in their atom structure are converted to an isotopic form having a different atomic weight but the same electric charge per atom as the original matter. This isotopic form being unstable, these elements tend to undergo, within a certain statistical time period, a further change to a more stable form. This change or deactivation from one isotopic form to another is accompanied by the emission of ionizing particles, and more specifically of beta particles, and the periods through which it takes place vary for different elements. The use of the elements listed above is especially suitable, first, because they are susceptible of strong activation by slow neutrons and, second, because their decay or deactivation periods are well adapted for laboratory measurement purposes. Thus, for example, silver has a shorter period with a half-life of 22 seconds, and a longer period with a half-life of 2.3 minutes. This may be termed the delayed effect of neutron bombardment.

The method of the present invention utilizes this delayed effect to measure the hydrogen atom content of any desired body or substance under investigation, and will be described with regard to one particular example selected for purposes of illustration, it being clear that the method is applicable to a variety of other uses, among which the following may be given likewise only for purposes of illustration: measurement of the amount or level of a hydrogen-containing liquid present in a container in pure form or in mixture or combination with other liquids not containing hydrogen; measurement of the degree of moisture present in a particular material or substance; analysis of the chemical composition of a substance with regard to a particular hydrogen-containing compound; measurement of the hydrogen embrittlement in metallic members such as pipes, plates, etc.; measurement of the pressure of a hydrocarbon or other hydrogen-containing gas in a closed vessel, etc.

Figure 1 illustrates the application of the present method with regard to the measurement of the saturation of a porous core 1, held in a metallic pressure barrel 3, through which water, oil or any other hydrogen-containing liquid or gas is circulated, if desired, under pressure, by means of pipes 5 and 7, and a suitable pumping equipment, not shown. A source of neutrons 9, such as a radium-beryllium mixture in a suitable lead container 11, is placed in any desired position in close proximity to the core 1. A test member or plate 15, made of or comprising an element capable of undergoing suitable isotopic changes under the effect of neutron bombardment, such as rhodium, indium, silver, manganese, dysposium, etc., is likewise placed adjacent and as close as possible to the core 1. The plate 15 may be positioned on the opposite side of the core 1, as shown in the drawing for clarity, or in any other angular relationship with the core and the source. It is however preferred to position the plate on the same side as the source, and specifically between the source and the core, as this arrangement has been found to give several important advantages, such as an improved total count and sensitivity, an improved differentiation between unequally saturated portions of the core, etc.

The test plate may be constructed in different forms or shapes. In Figure 1 it is shown constructed as the cylindrical cathode 15 of a Geiger counter or ionization chamber 17, provided with the usual anode 19, both the anode and the cathode being held at a desired pressure within an enclosure 22, made of glass or other suitable material. The anode and cathode are electrically connected by means of leads 31 and 33 to the amplifier, power supply and indicating or recording units 25 and 26.

It will thus be seen that in the embodiment of Figure 1, the plate 15 combines the functions of a test plate and of the cathode of the detector. At the beginning of an activation period, the detector is rendered inoperative by disconnecting the power supply, which is effected by turning off a switch 35 provided for this purpose in the unit 25, so that during the activation period the plate 15 serves only as the test plate.

The radiation from source 9 comprises fast neutrons and gamma rays. The gamma rays are of no consequence for the present method, and cannot furthermore exert any harmful action on the detector, which is inoperative and gives no indications during the activation period. The fast neutrons penetrate the core holder 3 and the core 1, being subjected therein to the usual scattering effect by collision with heavy atoms and being at the same time scattered and converted to slow neutrons by collision with the hydrogen atoms of the liquid saturating the core 1. The slow neutrons, scattering in all directions from core 1, impinge upon the plate 15 and activate said plate by transforming the metal thereof into an isotope. This activation phase or period is continued until the plate 15 is activated substantially fully or as fully as desired. Since the activation of an element proceeds asymptotically at approximately the same rate as its subsequent deactivation, that is, its conversion to a more stable condition upon the removal of the energizing source, the activation period may be readily selected on the basis of half-life period values of the element of the plate 15. To avoid errors in timing, round figures for the activation period, such for example as 5 minutes for silver or rhodium, may conveniently be selected.

When the plate 15 has been substantially completely activated, the source 9 is quickly removed to a place sufficiently distant from the detector to preclude the possibility of any radioactive effect thereon, and the detector 17 is put in operation by closing the switch 35.

As the plate 15, being free from the effect of the source 9, undergoes its isotopic change to a more stable state, which change is accompanied by the specific emission of ionizing beta particles, these particles produce their usual effect of causing a current or current pulses to pass between the electrodes 15 and 19 of the detector.

It must be particularly pointed out that the reason for building in the test plate 15 into the detector as the cathode thereof is that the penetration power of beta particles, on which the operativeness of the present method is based, is extremely small as compared with that of other types of radiations, such as neutrons or gamma rays. The present arrangement, wherein the beta particles do not have to pass through any layer or layers of solid material, as would be the case if the test plate were arranged exteriorly of the detector, is therefore effective in increasing the sensitivity of the system.

It is however possible, and sometimes even desirable according to the present invention, to use test plates which do not form a part of the detector structure. Thus, the plate 15 may be replaced with a test plate of any desired shape or form, such as a flat plate 15A, shown in Figure 2, which may be positioned and subjected to energization in the same manner as already described with regard to plate 15, it being understood that in such cases the detector 17 and the units 25 and 26 are removed from the proximity of the core 1 and source 9.

When the plate 15A has been substantially completely activated, it is removed from the proximity of the core 1 and arranged to act on the detecting and measuring apparatus of Figure 3, which is sufficiently remote from the sphere of source 9 to be free of any radioactive effects of the latter.

The plate 15A is placed in close proximity to a detector 47, which is likewise of the Geiger-Mueller counter or ionization chamber type. As the plate 15A, being removed from the effect of the source 9, undergoes its isotopic change accompanied by the specific emission of ionizing beta particles, these beta particles penetrate the detector 47, causing the latter to give its conventional response in the form of a current or current pulses, known as counts, passing between the anode 49 and the cathode 41 thereof.

In view of the low penetration power of the beta particles, the usual fairly thick outer walls or envelope of the conventional detector 47 are provided with a thinned portion or window 43 made of a material easily pervious to beta-particles, such for example as a thin sheet of mica, which may be supported for mechanical strength by an internal or external lattice work diagrammatically shown at 44 and made of metal or other suitable material.

The current or current pulses or discharges originating in detectors 17 or 47 are transmitted to an amplifier unit 25, which comprises also a power unit, supplying the necessary operating voltages for both the detector and the amplifier. The amplified pulses are then transmitted to an indicating unit 26, which indicates, registers or records the number of pulses received throughout a predetermined time interval. Since the number of such pulses per unit time may sometimes be relatively high, tending to overload the apparatus, the indicating unit may be provided with a scaling unit adjustably adapted to indicate only every 4th, 8th, 16th or 32nd pulse.

Since the number of pulses produced by the detector in a predetermined time period is proportional to the degree of activation of the plates 15 or 15A, which is in turn proportional to the amount of slow neutrons impinging upon said plates during the activation period, and since the number of these slow neutrons formed by collision with hydrogen atoms is a function of the number of said hydrogen atoms, and therefore of the quantity of the hydrogen-containing liquid saturating the core, this saturation can be easily determined by the present method after properly calibrating the apparatus used.

Thus, as an example, the core 1 may be saturated with kerosene to a 100% saturation, and the test plate activated for 5 minutes with the apparatus arranged as shown in Figure 1. Fifteen seconds after the end of the activation period, the counting period is started by switching on and operatively energizing the apparatus of Figs. 1 or 2. If, for example, a count of 685 pulses is registered for the first minute, a count of 320 for the second minute, and a count of 210 for the third minute, and the normal background noise or count of the apparatus under the conditions used is approximately 200 counts per minute, the counting is discontinued after 3 minutes, and the measurements repeated 5 times, a count of 1225 for a period of 3 minutes being finally obtained as an average total count. The operations are then repeated for decreasing known saturations of the core 1, until, for example, an average total of 620 counts is obtained with the core completely dry. The results of this calibration are plotted in Figure 3. If now it is desired to measure an unknown degree of saturation of the core 1 with the same liquid, it is only necessary to repeat the procedure described, and to refer the number of counts registered to the above curve. Assuming, for example, that such count is 915, the saturation of the core is found to be 65%. Taking $0.675 \sqrt{N}$ as the probable statistical error in counting N pulses, the probable error in a single run will be 20.25 counts or 2.2%. If the measurements of the unknown saturation are repeated 5 times, and 915 is found to be the average total of the counts registered, the probable error is further reduced by a factor of $\sqrt{5}$, giving a probable error of only 1%.

It is obvious that instead of determining the saturation of a core within the barrel 3, the method described above may be used to determine the pressure of a hydrogen-containing gas or gas mixture supplied thereto by means of pipes 5 and 7, the level of a hydrogen-containing liquid standing therein, etc.

We claim as our invention:

1. In a method for determining the pressure of a gaseous fluid comprising a hydrogen atom in its molecular structure, said gaseous fluid being confined in a solid container, the steps of subjecting said container to neutron radiation throughout a predetermined time period, whereby neutrons penetrating said container are slowed down by collision with hydrogen atoms present therein and are scattered by collision with atoms of other elements along the path of the neutrons, causing the scattered slow neutrons to strike a material capable of undergoing atomic structure changes under the impact of slow neutrons, thereby activating said material to an isotopic form, discontinuing said neutron radiation, permitting said material to become deactivated with an accompanying emission of ionizing beta particles, and registering the number of the particles emitted by said material during a subsequent predeter- 2. In a method for determining the level of a liquid confined in a container, said liquid comprising hydrogen atoms in its molecular structure, the steps of subjecting said container throughout a predetermined period of time to radiation from a radioactive source simultaneously emitting fast neutrons and radiations of other types, whereby the fast neutrons penetrating said container are slowed down by collision with hydrogen atoms present therein and are scattered by collision with atoms of heavier elements along the path of the neutrons, causing a portion of slow neutrons scattering from said container to strike a material capable of undergoing an isotopic change due to the effect of slow neutrons on its atomic structure, thereby activating said material to an isotopic form, discontinuing said activation by separating said source and said material in space by a distance sufficient to prevent the radiation of said source from reaching said material, permitting said material to readjust its atomic structure during a predetermined deactivation period by emitting ionizing beta particles, and registering the number of said ionizing particles emitted by said material during said deactivation period.

3. The method of claim 6, wherein the material capable of undergoing isotopic changes is silver.

4. The method of claim 6, wherein the material capable of undergoing isotopic changes is indium.

5. The method of claim 6, wherein the material capable of undergoing isotopic changes is dysposium.

6. In a method for determining the concentration of hydrogen atoms present in a fluid substance within a confined space, the steps of subjecting said substance to neutron radiation throughout a predetermined period of time, causing the neutrons slowed by passage through said substance to activate a test material capable of undergoing isotopic changes under slow neutron impact, discontinuing said neutron radiation, and registering the number of ionizing beta particles emitted by said material throughout a subsequent predetermined observation period.

EUGENE M. BRUNNER.
EDWIN S. MARDOCK.

REFERENCES CITED

The following references are of record in the file of this patent:

UNITED STATES PATENTS

| Number | Name | Date |
| --- | --- | --- |
| 2,206,634 | Fermi et al. | July 2, 1940 |
| 2,220,509 | Brons | Nov. 5, 1940 |
| 2,288,718 | Kallmann et al. | July 7, 1942 |
| 2,303,688 | Fearon | Dec. 1, 1942 |
| 2,304,910 | Hare | Dec. 15, 1942 |
| 2,323,128 | Hare | June 29, 1943 |
| 2,378,219 | Hare | June 12, 1945 |

OTHER REFERENCES

Livingood and Seaborg, article in Reviews of Modern Physics, Jan. 1940, pp. 30 and 34–43.